United States Patent

Cheng et al.

[15] 3,667,243
[45] June 6, 1972

[54] INDIRECT-FREEZING PROCESS WITH HEAT REUSE BY AN AUXILIARY WORKING MEDIUM

[72] Inventors: Chen-Yen Cheng, 2443 South Krameria Street, Denver, Colo. 80222; Sing-Wang Cheng, 83, Section 1, Chang-an East Road, Taipei, China /Taiwan

[22] Filed: July 10, 1968

[21] Appl. No.: 743,707

Related U.S. Application Data

[63] Continuation-in-part of Ser. No. 683,800, Nov. 17, 1967, which is a continuation-in-part of Ser. No. 346,112, Feb. 20, 1964, Pat. No. 3,354,083.

[52] U.S. Cl.................................................62/58, 210/67
[51] Int. Cl..........................................................B01d 9/04
[58] Field of Search....................62/439, 342, 123, 340, 345, 62/354, 58

[56] References Cited

UNITED STATES PATENTS

| | | | |
|---|---|---|---|
| 2,686,404 | 8/1954 | Kurtz | 62/342 |
| 3,234,747 | 2/1966 | McMahon | 62/58 |
| 3,253,419 | 5/1966 | Thomas | 62/58 |
| 3,354,083 | 11/1967 | Cheng et al. | 210/59 |
| 3,399,538 | 9/1968 | Sliepcevich | 62/58 |

*Primary Examiner*—Norman Yudkoff
*Assistant Examiner*—S. Silverberg

[57] ABSTRACT

The present invention is related to a separation process by which a substance can be separated in a more or less purified state from a solution containing it. In the process, the solution is partially solidified by an indirect contact cooling operation and the deposited solid is then melted in situ to yield the purified substance. High quality deposit is obtained by maintaining an appropriate flow of the solution over the surface of the deposited solid during the solidification operation and by growing the deposit at a low growth rate. Heat reuse in these operations is accomplished by the help of an auxiliary working medium which undergoes a cyclic change. The medium undergoes an endothermic transformation, such as melting, vaporization, etc., to absorb the heat liberated during the partial solidification operation and undergoes the corresponding reverse operation, which is exothermic, to supply the heat required in melting the deposited solid. Since the transformation temperatures of both the main system and the auxiliary system during the operations described above are functions of the respective applied pressures, the temperature differentials required in these heat exchange operations between the main and the auxiliary systems can be obtained by selecting a suitable working medium and by maintaining the pressure applied to these systems during the operations or appropriate values. Work is supplied to the process through the necessary pressurization operations.

The working medium used may undergo a set of solid liquid transformations, a set of liquid vapor transformations, or any other reversible transformations. When a rigid wall is used to separate the medium from the main system, the pressures applied to them may be different at a given time. However, when a deformable vessel is used to separate the two systems. both systems are maintained substantially at the same pressure at any given time. The processes of the present invention are classified according to the nature of transformations of the working medium and the nature of the wall separating the two systems. The equipments which can be used in these processes are also described.

5 Claims, 20 Drawing Figures

Phase diagrams illustrating
$(S/L)_w - (S/L)_m$ couplings.

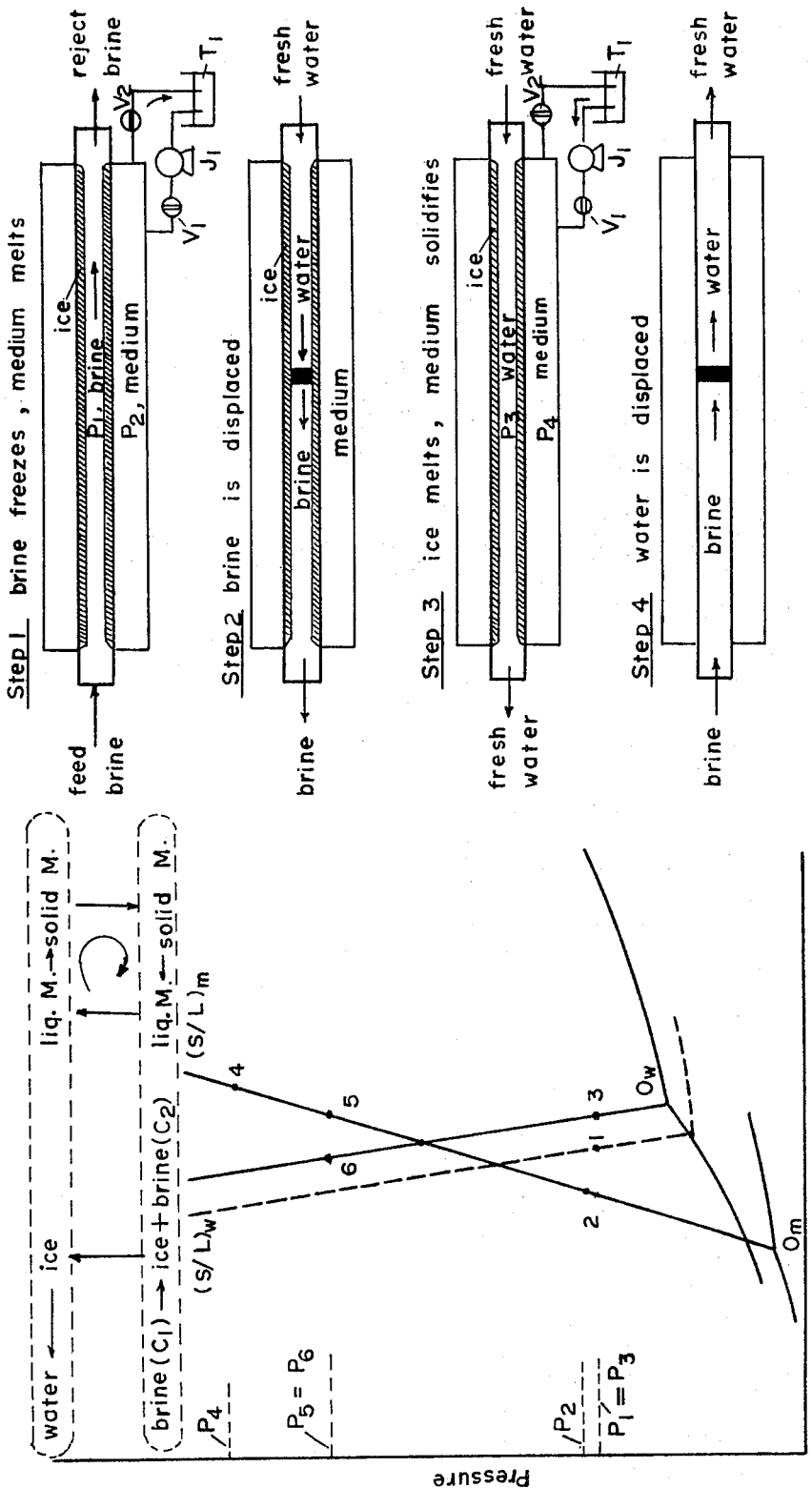
Fig. 1. Phase diagrams illustrating $(S/L)_w - (S/L)_m$ couplings.
Fig. 2 An indirect-freezing and in situ-melting process with a $(S/L)_w - (S/L)_m$ coupling, method A.
INVENTOR
Chen-Yen Cheng

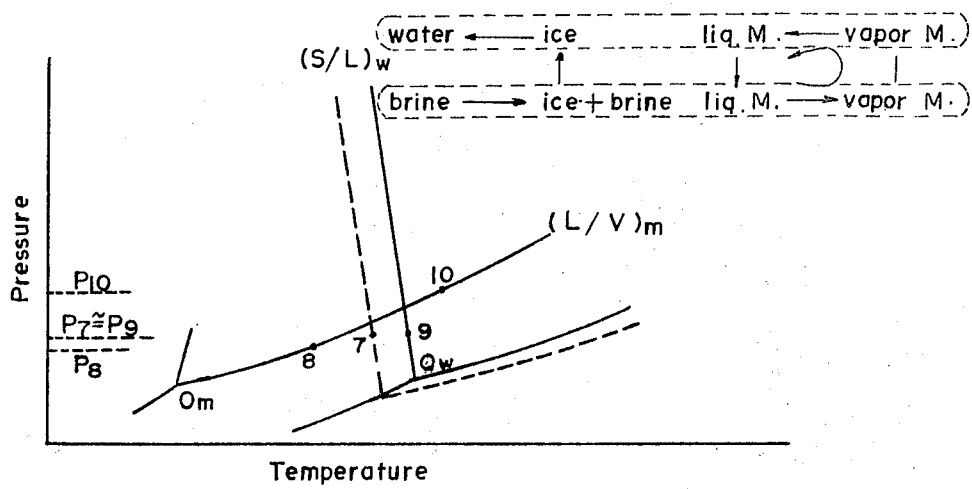
Fig. 3 Phase diagrams illustrating a $(S/L)_w$-$(L/V)_m$ coupling.
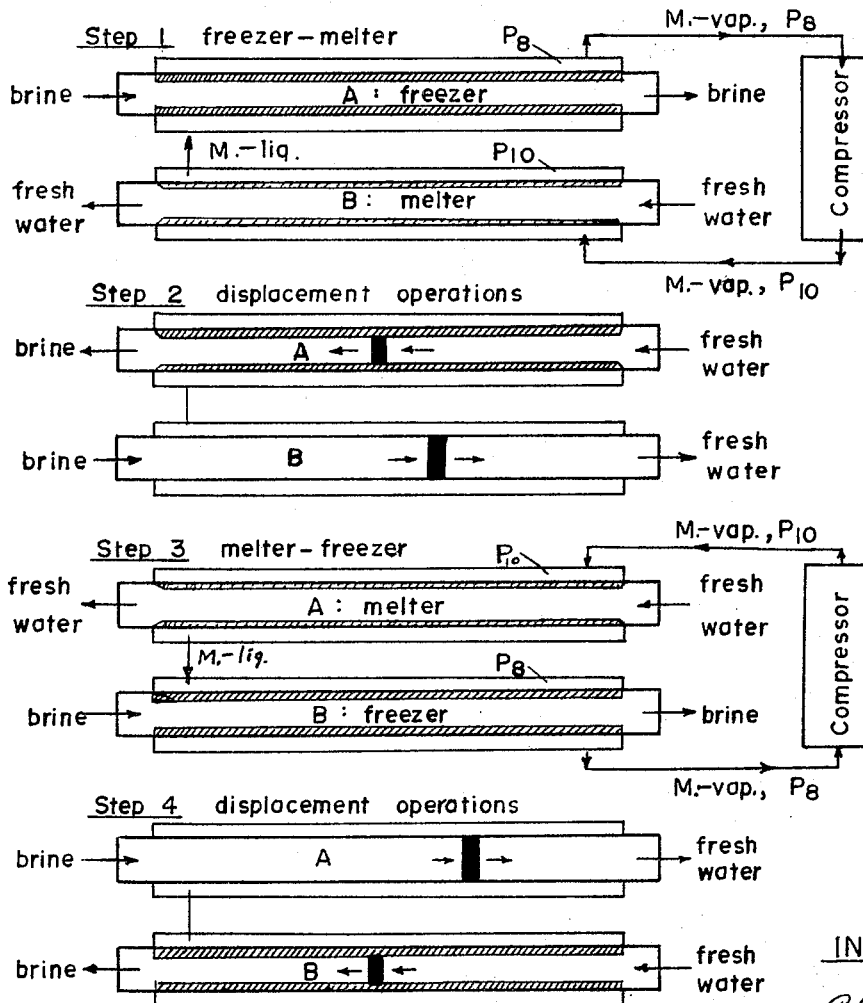
Fig. 4 An indirect-freezing and in situ-melting process with a $(S/L)_w$-$(L/V)_m$ coupling

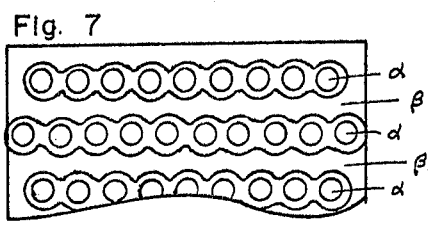
Fig. 6 Fins for $\alpha$-conduits
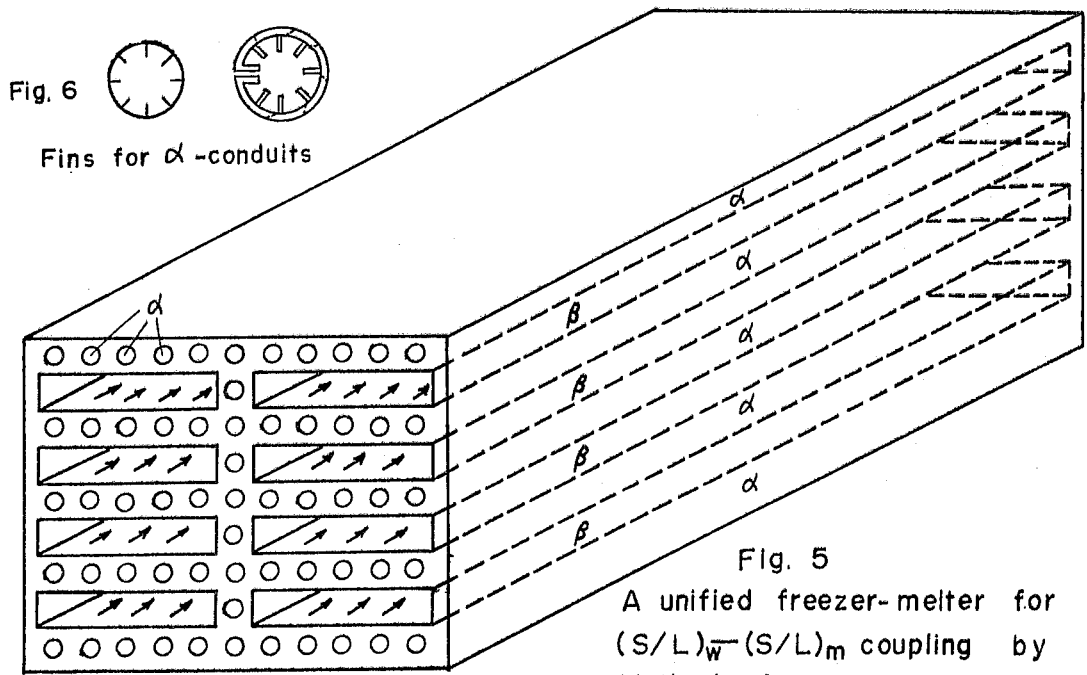
Fig. 5 A unified freezer-melter for a $(S/L)_{\overline{w}} - (S/L)_m$ coupling by Method A.
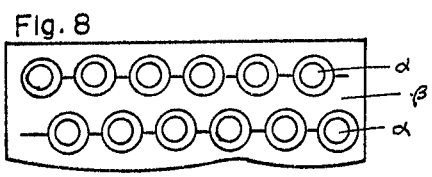
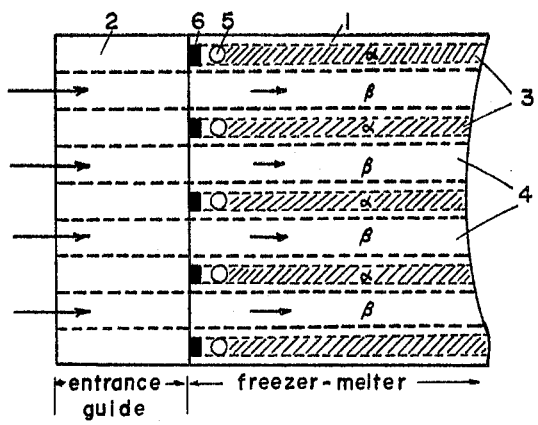
Fig. 9 An entrance to a freezer-melter.
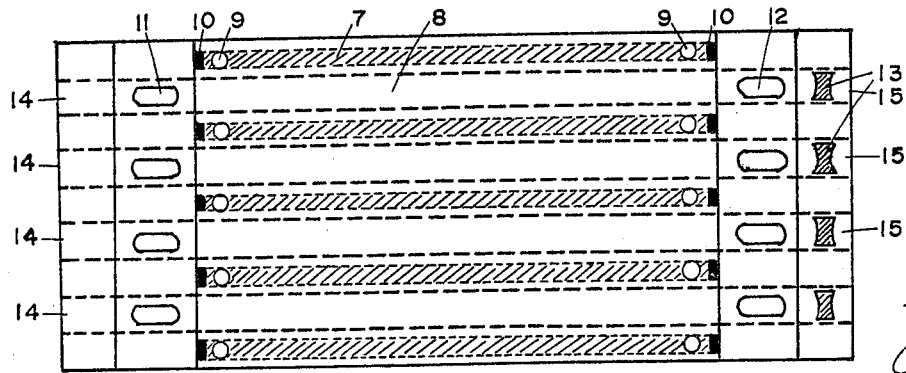
Fig. 10 A freezer-melter assembly for $(S/L)_{\overline{w}} - (S/L)_m$ coupling by Method A.
INVENTOR
Chen-Jen Cheng

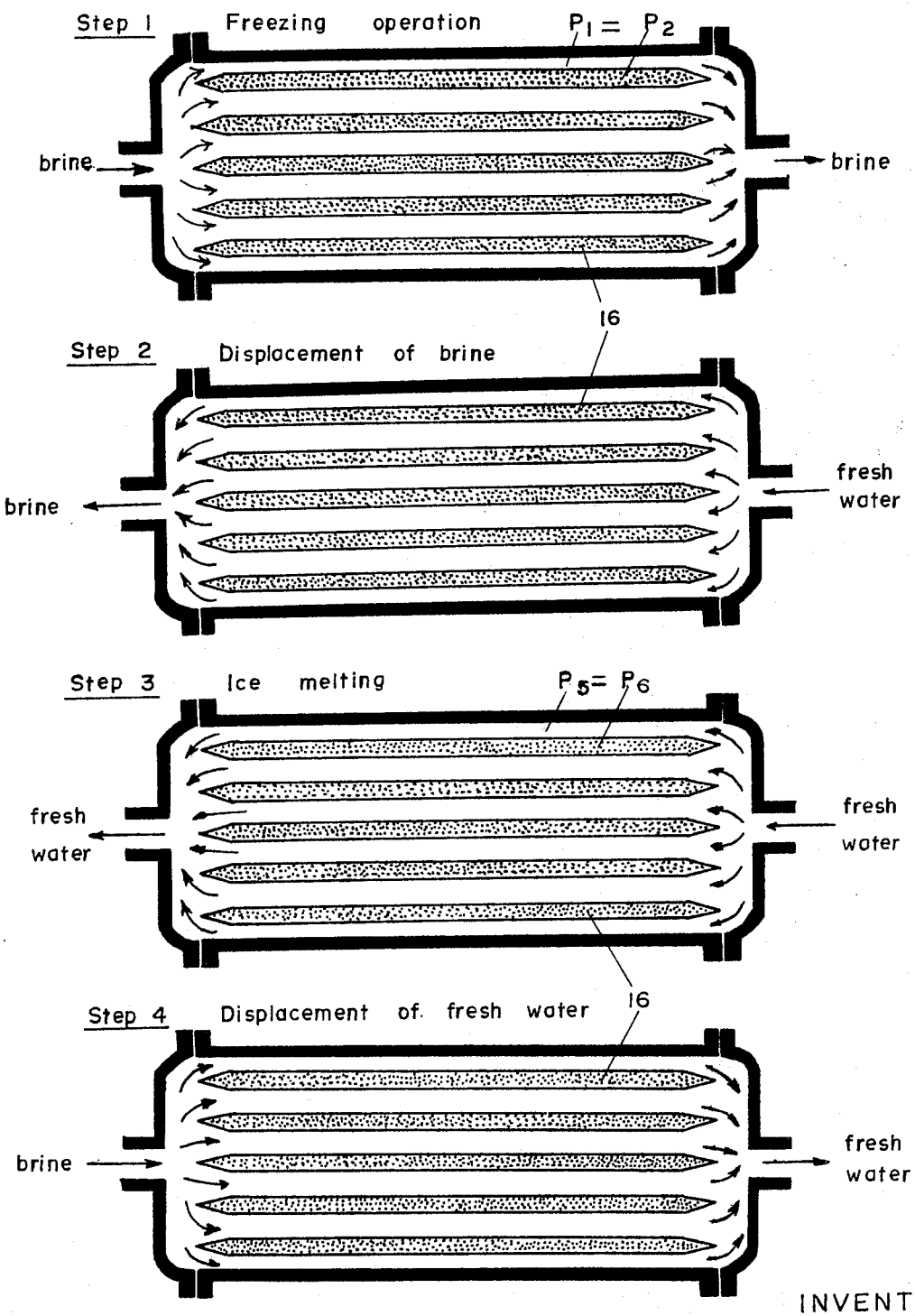
Fig. 11 An indirect-freezing and in situ-melting process with a $(S/L)_w - (S/L)_m$ coupling by Method B.

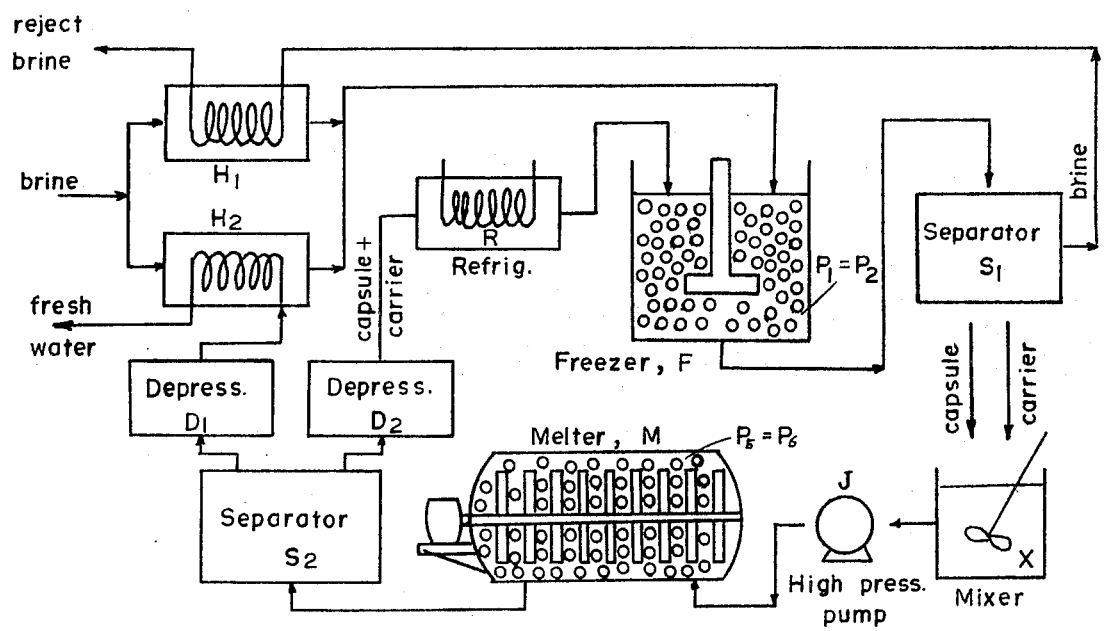
Fig. 12 An indirect-freezing and in situ-melting process with a $(S/L)_w - (S/L)_m$ coupling, Method C.
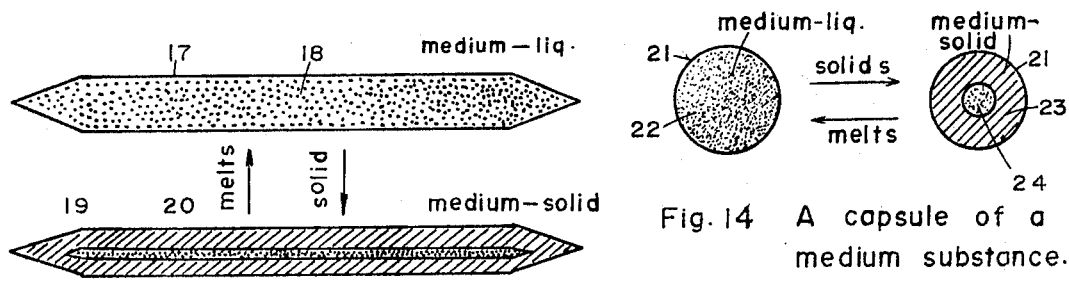
Fig. 13 A deformable vessel enclosing a medium substance.
Fig. 14 A capsule of a medium substance.
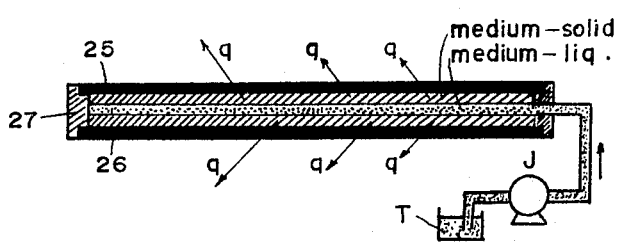
Fig. 15. Freezing of a medium substance under a high pressure.
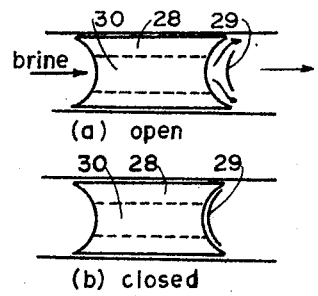
Fig. 16 A displacement piston
INVENTOR
Chen-Yen Cheng

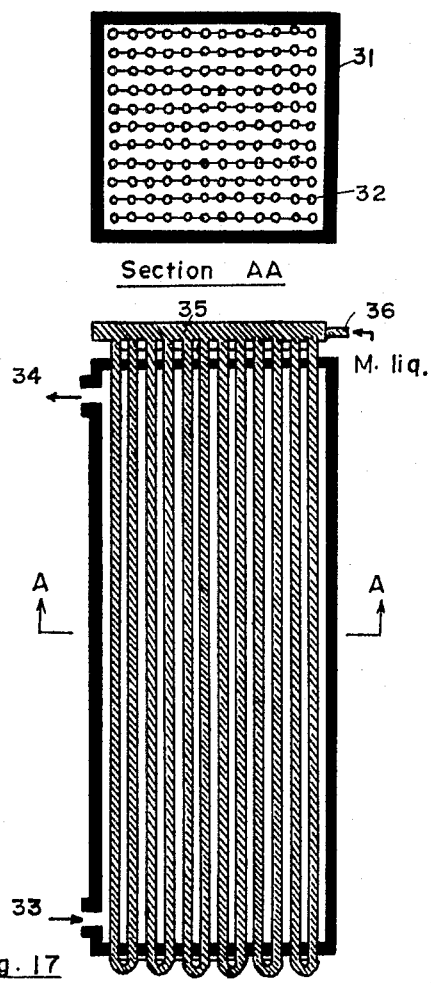
Fig. 17
A small tube freezer-melter for a $(S/L)_w$-$(S/L)_m$ coupling by Method A.
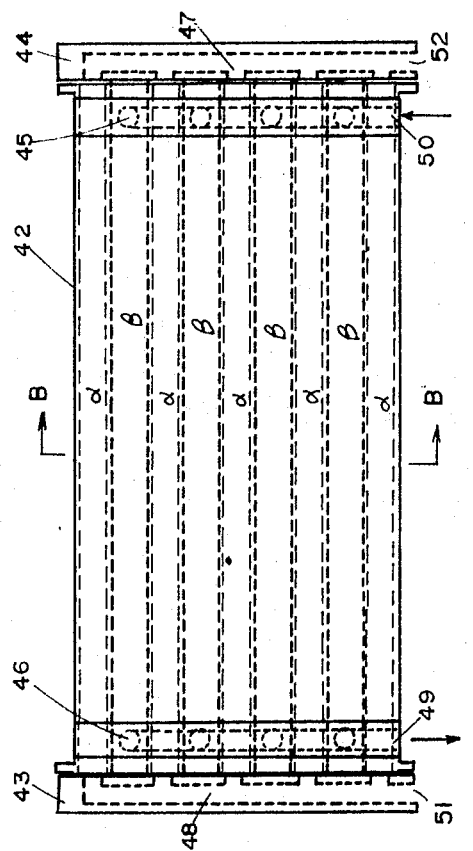
Fig. 19. A unified freezer-melter for a $(S/L)_w$-$(L/V)_m$ coupling.
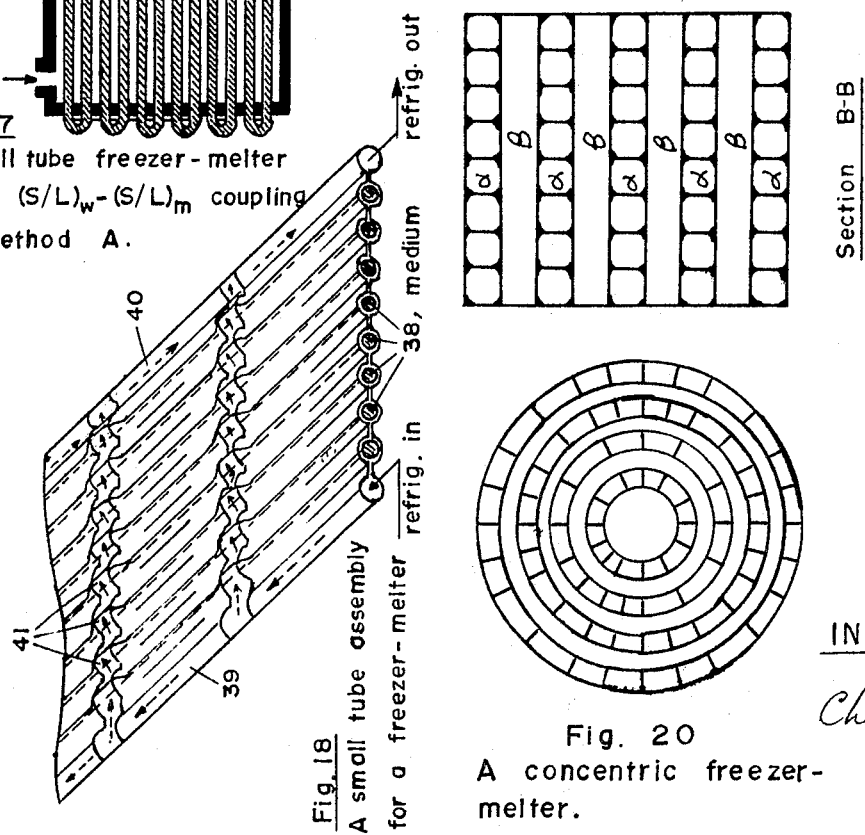
Fig. 18
A small tube assembly for a freezer-melter.
Fig. 20
A concentric freezer-melter.
INVENTOR
Chen-Yu Cheng

INDIRECT-FREEZING PROCESS WITH HEAT REUSE BY AN AUXILIARY WORKING MEDIUM

I. INTRODUCTION

This application is a continuation-in-part of our pending application for United States Letters Patent entitled "Separation of Fresh Water from Aqueous Solutions," which was filed Nov. 17, 1967, bearing application, Ser. No. 683,800. The latter application is in turn a continuation-in-part of our application for United States Letters Patent entitled "Separation of Fresh Water from Aqueous Solutions," which was filed Feb. 20, 1964, and which was designated as application, Ser. No. 346,112, the same having issued Nov. 21, 1967 as U.S. Pat. No. 3,354,083.

This invention is to separate a substance in a more or less purified state from a solution containing it by, first, separating the substances from the solution in a solid state by a progressive freezing operation and then melting the deposited solid in situ. High quality deposit is obtained by maintaining an appropriate flow of the solution over the surface of the deposited solid during the freezing operation and by growing the deposit at a low growth rate. The heat reuse in these operations is obtained by the help of an auxiliary working medium which undergoes a cyclic process consisting of a set of reversible transformations, one is endothermic and the other is exothermic. The medium is kept separated from the main system and is yet kept in heat exchange relation with the main system by either a rigid or a flexible heat conducting wall. By maintaining the main system and the auxiliary system under appropriate pressures during these operations, the medium can absorb the heat liberated in the partial solidification operation by undergoing its endothermic transformation and can also supply the heat required in the melting of the deposited solid by undergoing its reverse transformation.

The reversible transformations of a working medium may be a melting solidification pair (denoted simply as S/L transformations), a vaporization-condensation pair (denoted as L/V transformations) or any other phase transformations, such as allotropic and monotropic transition between two solid states and mutual dissolution and separation of phases, and chemical transformations such as isomerization. When a S/L type working medium is used, the medium is melted as the main system is solidified and the medium is solidified as the deposited solid in the main system is melted. Such a coupling between the main system and the working medium is simply represented as a $(S/L)_W - (S/L)_M$ coupling, where the subscripts W and M respectively represent the main system and the working medium. Similarly, when a L/V type working medium is used, evaporation and condensation respectively take place in the working medium as solidification and melting take place in the main system. Such a coupling is simply represented as a $(S/L)_W - (L/V)_M$ coupling. Processes of the present invention have been classified according to the type of the coupling and the nature of the separating wall. Some designs of the equipments such as unified freezer-melter units which are suitable for conducting the desired operations will be described. It will be shown that such equipments can be constructed at low costs. Furthermore, it will be shown that the work input required in a process of the present invention is quite low —e.g. the pumping required in a $(S/L)_W - (S/L)_M$ coupling is simply to pump working medium liquid in an amount to compensate for the volume shrinkage associated with the solidification of the working medium to the desired operating pressure.

A unified freezer-melter to be described contains α-conduits and β-conduits. The working medium is confined in α-conduits and a solution to be purified flows in β-conduits. After a solidification operation, a layer of solid is deposited on the surfaces of each β-conduit and the remaining part of the conduit is filled with mother liquor. A deformable elastic piston may be pushed along the β-conduit to displace the mother liquor after a solidification operation. This displacement operation eliminate a rather costly conventional washing method.

A process of the present invention can be applied to:
1. separating fresh water from an aqueous solution such as a brackish water, sea water and waste water,
2. concentrating milk, cane juice, orange juice, tomato juice and other fruit juices, enzyme solutions, colloids and suspensions,
3. purification of organics such as p-xylene, m-xylene, benzene, wax, naphthalene, etc.,
4. initial, enriching operation in the manufacture of heavy water from ordinary water.

Some conventional fractional solidification processes are briefly reviewed in this section in order to compare them with processes of the present invention. Several desalination processes belong to direct contact fractional solidification processes. They are (1) the so-called Vaccum-Freezing Vapor-Compression Process, which is under development by Colt Industries and (2) the so-called direct contact Secondary Refrigerant Processes under development by Struther Co., Carrier Corp., and Blaw-Knox Co.. In the Vacuum-Freezing Vapor-Compression Process, water is flash evaporated from an aqueous solution under a low pressure so that ice crystallizes out at the same time. The heat of crystallization in this ice-making operation is removed by the evaporation of water. The ice is separated from the mother liquor and purified in a washing column. The water vapor is compressed to increase its condensation temperature and the compressed vapor is directly contacted with the purified ice, so that ice is melted as the water vapor is condensed. The condensate and the ice-melt become the purified water. In the Secondary Refrigerant Processes, a secondary refrigerant such as butane and octaflurocyclobutane is flach evaporated while in direct contact with a solution to be purified. Ice crystallizes out of the solution as the refrigerant is evaporated. The ice is separated from the mother liquor and purified in a washing calumn. The secondary refrigerant vapor is compressed to increase its condensation temperature and the compressed vapor is directly contacted with the purified ice so that ice is melted as the refrigerant vapor is condensed. The refrigerant condensate is recycled to the ice-making operation and the ice-melt becomes the product water. The main drawbacks of these processes are : (i) high power consumption (ii) high plant cost and iii) the operations are rather complicated.

It may be instructive to compare the present processes with a rotary-drum crystallization processes, since they are indirect contact fractional solidification processes and have similar applications. The significance of the present invention can be appreciated by realizing the advantages of the present process as compared with the rotary-drum process. The rotary-drum crystallization process is described in detail in the following book:

"Fractional Solidification," Chapter 15 edited by Zief and Wilcox, published by Marcel Dekker Inc., New York (1967). Basically, a single stage rotary-drum crystallizer consists of a horizontally mounted hollow cylinder which is partially immersed in the solution (or the melt) with cooling medium entering and leaving the inside of the cylinder through hollow trunnions. As the cylinder rotates, crystals that have formed on the immersed portion of the cylinder emerge from the solution (or the melt) as a crystalline cake, are air cooled to some degree, and the cake is removed by a suitable device, such as a doctor knife. Good agitation of the melt near the surface of the drum must be attained for effective mass-transfer rate and avoid constitutional supercooling. The cooling medium which becomes heated in the crystallizer is cooled by a regeneration unit before being recycled. From the above descriptions, it is seen that the rotary-drum process has the following disadvantages:

1. The equipment cost per unit heat transfer area is very high. Therefore, in practice, a rather large $\Delta t$ has to be used to obtain a practicable heat transfer rate.

2. This high heat transfer rate together with the ineffectiveness of mechanical agitation of the solution tend to cause constitutional supercooling which again causes entrapping of impurities in the cake crystal.
3. No provision is made to reuse the heat of freezing in the melting of the cake. Therefore, the operating cost is rather high.

Several unsuccessful attempts have been made to separate fresh water from sea water, brackish water and waste water by indirect contact freezing. For example, the University of Washington, Seattle has reported their work of freezing sea water in various ice-making machines, seperating the ice and melting the ice in the Office of Saline Water Report No. . They have observed significant salt rejection but the quality of water so produced was not good enough. Evidently, they have not maintained adequate flow of the brine at the deposited ice surface and the ice being deposited too quickly and an ice deposit of dendrite structure has been obtained. In the processes of the present invention, the freezer-melter unit have been so designed and operated that an adequate flow of the solution is maintained at the surface of the deposited solid and the deposit is grown at a low growth rate, so that a stable solid-liquid interface can be maintained. In order to grow deposit at a low growth rate, a freezer-melter used should have a low unit area cost. Various designs of freezer-melter units which can be constructed at low unit area costs are described The present author has applied for letters patent on a separation process entitled "Fractional Solidification Process with Heat Reuse by the Application of Pressure, "Ser. No. 712,297.

In the process, high quality deposit is also obtained by adequate flow and low growth rate. The process is different from those of the present invention, because it does not use an auxiliary working medium to attain the heat reuse.

II. PROCESS DESCRIPTIONS

1. Introduction

In a separation process which is based on the fractional solidification principle, the feed solution is first partially frozen, the deposited solid is separated from the mother liquor and the purified solid is melted to give the desired purified substance. In order to carry out the separation process economically, the heat removed in the solidification step has to be reused to supply the heat required in the melting step. In order to accomplish the hea reuse, some sort of heat pump has to be incorporated in the system and work has to be done to the system.

In a process of the present invention, an auxiliary working medium which undergoes a reversible transformation at a temperature or temperature range in the vicinity of the transition (solidification and melting) temperatures of the main system is used as a heat exchange medium. It is so used to absorb the heat of solidification of the feed solution by undergoing its endothermic transformation and then supply the heat required in the melting of the deposited solid by undergoing its reverse transformation, which is exothermic. The medium, therefore, undergoes a cyclic change. In the following, we will describe cases where the reversible transformations are either a melting-solidification set or a vaporization-condensation set. Since the transformations taking place in the main systems are a solidification-melting set, the former case will be simply referred to as a $(S/L)_W - (S/L)_M$ coupling and the later will be referred to as a $(S/L)_W - (L/V)_M$ coupling. Separation processes belong in the $(S/L)_W - (S/L)_M$ coupling type will be farther classified into method A, method B and method C, depending on the nature of the wall used in separating the main system from the auxiliary working medium system. In method A, rigid wall is used; in method B, a flexible vessel is used to enclose the working medium; and in method C, encupsulated working medium is used.

2. A Separation Process Which is Based on a $(S/L)_W -$ $(S/L)_M$ Coupling.

In a separation process belonging to this category, the working medium undergoes melting and solidification respectively as the feed solution is fractionally solidified and the deposited solid is melted. The process takes advantage of the fact that the melting point of a pure substance, the melting range of a mixture and the freezing temperature of a solution vary with the applied pressure. Therefore, the temperature differentials required in these heat exchange operations can be obtained by selecting a suitable working medium and by maintaining appropriate applied pressures on the main system and the medium system during these operations. According to P. Bridgman, melting point of an ordinary substance is raised by 1° C. as the applied pressure is increased by 40 atm to 60 atm (see line 2–5–4 in FIG. 1) and melting point of water is lowered by 1° C. as the applied pressure is raised by 100 atm. (see line 3–6 in FIG. 1) The dotted line along line 3–6 in FIG. 1 shows the variations of the freezing temperature of an aqueous solution with applied pressure.

A separation of fresh water from an aqueous solution by a $(S/L)_W - (S/L)_M$ coupling is also illustrated in the figure. Refering to the upper part of the figure, a brine is partially solidified at the prevailing pressure $(P_W)_s$ and temperature $(T_W)_s$. The heat of solidification is absorbed by melting an working medium at the prevailing pressure $(P_M)_m$ and temperature $(T_M)_m$. The deposited ice is separated from the mother liquor and is melted under pressure $(P_W)_m$ and at temperature $(T_W)_m$. The heat required in this melting operation is supplied by solidifying the working medium under pressure $(P_M)_s$ and at temperature $(T_M)_s$. In the above notations the subscripts, W and M within the brackets respectively represent the main system and the working medium and the subscripts, s and m outside the brackets respectively represent solidification and melting. The notations introduced above are summarized as follows:

$(P_W)_s$, $(T_W)_s$ =respectively, pressure applied to the feed solution and the freezing temperature of the solution during the partial solidification operation.

$(P_W)_m$, $(T_W)_m$ =respectively, pressure applied to and the temperature of the deposited solid during the melting of the deposited solid.

$(P_M)_s$, $(T_M)_s$ =respectively, pressure applied to the medium and the solidification temperature during the solidification of the medium.

$(P_M)_m$, $(T_M)_m$ =respectively, pressure applied to the medium during the melting of the medium and the melting temperature of the medium.

In order to carry out the described heat exchange relations, the following relations should hold;

$$(T_W)_s > (T_M)_m \; ; \; (T_W)_m < (T_M)_s \qquad (1)$$

Since these transition temperatures are functions of the applied pressures, we can write $$(T_W)_s = f_1\{(P_W)_s, C\},$$
$$(T_W)_m = f_2\{(P_W)_m\},$$
$$(T_M)_s = f_3\{(P_M)_s\},$$
$$(T_M)_m = f_4\{(P_M)_m\},$$

where C is the concentration of the brine. Therefore, for a given brine composition, infinite number of sets of values for $\{(P_W)_s, (P_W)_m, (P_M)_s, (P_M)_m\}$ can be found which would satisfy the inequality relation given as (1). Any such set of values of P's will enable the desired heat reuse. When a set of values of $\{(P_W)_s, (P_W)_m, (P_M)_s, (P_M)_m\}$ to be used is such that either one or both of the following relations $$(P_W)_s \neq (P_M)_m \; ; \; (P_W)_m \neq (P_M)_s$$

hold, the separating wall should be rigid and be thick enough to withstand the pressure differential between the two systems. When a flexible wall is used to separate the two systems, we have the following constraining relations:

$$(P_W)_s = (P_M)_m \; ; \; (P_W)_m = (P_M)_s.$$

In the following paragraphs, three preferred types of operating conditions are described. These should not be considered as liminitive of the present invention and should be considered as typical sets of operating conditions.

Type 1 operation

Solidification of the feed solution, melting of the deposited solid, and melting of the working medium are conducted at near atmospheric pressures and only the medium is solidified at a pressure high enough to reverse the heat flow: i.e., $(P_W)_s \cong (P_W)_m$  $(P_M)_m \cong 1$ atm, and $(P_M)_s = $ a high pressure.

In this type of operation, the working medium used should have a normal melting poing somewhat lower than the normal freezing temperature of the solution and a rigid wall should be used to separate the two systems and withstand the pressure differential during the melting of the deposited solid.

For example, let us assume that fresh water is to be separated from a brine containing 5% NaCl. The solidification temperature under $(P_W)_s = 1$ atm. is $(T_W)_s = -2.97°$ C. Assuming that 0.5° C. temperature differential is allowed for heat exchange, the melting temperature of the working medium should be $-3.47°$ C. The melting temperature of the deposited solid (ice) under $(P_W)_m = 1$ atm. is 0° C. Assuming that 0.5° C. temperature differential is again allowed for the heat exchange, the medium has to be solidified at 0.5° C. Therefore, the transition temperature of the medium has to be shifted from $-3.47°$ C. to 0.5° C. Therefore, the total shift in the transition temperature is 3.95° C. Assuming that the melting poing of the working medium used is raised by 1° C. as the applied pressure is raised by 50 atm., the pressure to be applied in the solidification of the working medium is calculated as $(P_M)_s = 3.95 \times 50 \cong 200$ atm.. Therefore, the wall separating the two systems should be thick enough to withstand this pressure differential.

The only economical way of constructing a separating wall which withstands the described high pressure and provide large heat transfer area is to use a small diameter conduit such as a small tube. The freezer-melter units to be described shortly incorporate the above considerations.

In an ordinary heat exchanger, the fluids involved flow at high flow rates in conduits separated by a conducting wall. The high flow rates of the fluids involved are required in order to improve heat transfer coefficients and are required because of the low heat absorbing and heat releasing capacities of the fluids due to the fact that the heat exchanged is sensible heat of the two fluids. In a small conduit such as described above, it may become difficult to circulate the medium through the conduit. Since the working medium is solidified and melted in the conduit, the main resistance to heat transfer is the resistance of the medium solid itself. Since, the medium in the conduit undergoes phase transformations, melting and solidification, it has a large heat absorbing capacity and a large heat releasing capacity. Furthermore, when the conduit is small enough, conduction becomes the predominating heat transfer mechanism. Therefore by using small conduits, or conduits with extended surfaces, we may omit circulation of the medium in the conduits without seriously damaging the heat transfer rate. This is a very important feature in this invention. Therefore, in the following descriptions, it is assumed that the medium is not circulated in the conduit, except for the flow of medium caused by the expansion of the medium during its melting operation or the flow of medium required to keep the medium pressurized during its solidification operation.

As has been described, the volume of the working medium shrinks as the working medium is solidified. One way to keep the medium pressurized is to pump some fluid, which may or may not be the working medium itself, into the space occupied by the medium. The volume of fluid to be pumped in this way is substantially equal to the volume shrinkage accompanied by the solidification, which is about 10 percent of the volume of the working medium which is solidified. An alternative way is to use either a piston or a plunger to pressurize the medium during its solidification. Still another way is to pump a liquid and pressurize the medium through a flexible bag.

The operating conditions illustrated above are typical in the desalination of sea water. In the desalination of brackish water or waste water, the pressure applied to the medium during its solidification operation is much lower than the value shown because of the lower salinity and consequently smaller freezing point depression. The application of this type of operation (Type 1 operation) is not limited to the separation of fresh water from a brine. It can also be applied in the separation of a substance, such as an organic substance, from a solution. It is recalled from the discussions that in this type of operation, the reversal in heat flow is accomplished simply by raising the solidification temperature of the working medium by raising the pressure applied to the medium. Therefore, the shapes of the melting curve or the freezing curve of the main system have no consequence in the operation. The limitations to Type 1 operation are:

i. The difference in the transition temperature of the main system, i.e., melting point of the deposited solid minus the freezing temperature of the solution, must be reasonably small. This is because, when this difference is too large the pressure to be applied to the working medium in order to reverse the heat flow becomes excessively high.

ii. A working medium, which has a normal melting point or melting range somewhat lower than the freezing temperature of the feed solution should be found.

It has been described that in order to obtain high quality deposit during the partial solidification step, it is necessary to maintain an appropriate flow of the solution over the surface of the deposited solid and the deposit be grown at a low growth rate. Such an adequate flow and a low growth rate has to be maintained substantially throughout the deposited solid. In order to meet the above requirements, the following conditions are provided:

1. In a unified freezer-melter to be described, the heat transfer area on the solution side has substantially identical cross section in the direction perpendicular to the direction of the solution flow so that the solution can sweep all over the surface. When metal fins are attached, they are installed in the longitudinal direction to meet the above condition.

2. The growth rate is controlled by adjusting the pressure applied to the medium. The allowable growth rate depends on the degree of purification required and the degree of mixing of the solution at the surface of the deposited solid. Generally, the growth rate is maintained at 0.01 $^{mm}$/min to 0.5$^{mm}$/min, which is much lower than the growth rate conventionally reported. Furthermore deposit is grown to a thickness less than 2 mm before it is shifted to melting operation in order to prevent imposing too much resistance to heat transfer. The discussions given above apply to all processes of the present invention.

When a working medium whose normal melting point is lower than the normal freezing point of the feed solution by an amount more than the value desired, it is also possible to pressurize the medium during the partial freezing of the feed solution in order to narrow the temperature differential. It will be noticed, however, that when such a working medium in used, the pressure to be applied to the medium during the melting of deposited solid, $(P_M)_s$, will be higher by the amount of pressurization described.

FIG. 2 illustrates the operation of a unified freezer-melter which is based on Type 1 operation which is referred to as method A in the figures. As shown in the figure, the unified freezer-melter consists of two concentric tubes. The main system to be processed occupies the inner tube and the working medium occupies the concentric space. The operation consists of four steps. The operation will be explained again by referring to seperation of fresh water from a brine.

Step 1

The working medium in the annulus space is at least partially solidified at the beginning. Its pressure $(P_M)_m$ is maintained at $P_2$ and its melting temperature is somewhat lower than the freezing temperature of brine which is maintained at $(P_W)_s = P_1 = 1$ atm.. The brine flows through the inner tube. Heat is transferred from the brine to the medium. Therefore, a layer of ice is deposited on the inner wall as the medium is melted in the annulus space. During this step, the valve $V_2$ is open, and the valve $V_1$ is closed. As the medium is melted, its volume increases. Therefore, some medium liquid in the amount equivalent to the expanded volume is discharged through the valve $V_2$ into tank $T_1$. As has been described the pressure $P_2$ or $(P_M)_m$ may be adjusted in order to produce high quality ice deposit. At the end of this step, the medium is mostly melted and a layer of ice is deposited in the inner tube forming an ice tube and mother liquor occupies the remaining space in the inner tube.

Step 2

In this step, the brine in the tube is to be replaced by fresh water in preparation for the melting step to be described. This displacement operation can be simply accomplished by using fresh water to push a deformable floating piston. At the end of this step, inner tube is occupied by the deposited ice and fresh water.

Step 3

During this step, fresh water is circulated within the inner tube, valve $V_2$ is closed, valve $V_1$ is opened and some medium fluid is pumped into the annulus space to pressurize the medium to such a pressure $P_4$ or $(P_M)_s$ so that the temperature prevailing in the medium $(T_M)_s$ is higher than that of the melting point of the ice under $(P_W)_m = P_3 = 1$ atm. The ice is melted as the medium is solidified. As has been described, some medium liquid has to be pumped in order to compensate for the volume shrinkage of the medium due to the solidification. While the cooling rate in Step 1 has to be controlled to obtain high quality ice deposit, there is no such limitation to the rate of heat transfer in this step. Therefore, it may be economical to shorten this period by having higher temperature difference in this step. At the end of this step, the inner tube is filled with fresh water and the medium is mostly solidified.

Step 4

In this step, the fresh water in the inner tube is to be replaced by feed brine in preparation for the solidification step, Step 1. After this step, the operation goes back to Step 1.

In a system operated below the ambient temperature, there is a graduate build-up of heat within the system due to the work supplied to the system and due to the heat leakage into the system. Therefore, an auxiliary refrigeration is required to keep the system in thermal balance. Such an auxiliary cooling is not shown in the figure. For a system operated above ambient temperature, there is still a tendency of heat build-up due to the work supplied to the system. But if the heat leakage outward is large we may have to supply auxiliary heating in order to keep the system under thermal balance.

The cyclic operation described above apply also to separation of a substance from a solution containing it by simply replacing the brine and the deposited ice, respectively by the solution and the deposited solid.

FIG. 15 shows how a working medium is solidified under a high pressure. A conduit 25 is closed by a plug 27, and contains the working medium. A high pressure pump J is used to pressurize the working medium so as to raise its solidification temperature. As heat flows out of the medium, a layer of solid medium is deposited on the wall. Medium liquid is pumped in from tank T through the pump J to compensate for the volume shrinkage and keep the medium pressurized.

FIG. 5 shows an extruded metal structure for a freezer-melter to be used in a $(S/L)_W - (S/L)_M$ coupling operation by method A. It can be conveniently manufactured by extruding aluminum or its alloys. It consists of $\alpha$ and $\beta$ layers. Small conduit means are provided in the $\alpha$-layers which serve as pressure vessels for containing the working medium. Feed brine or other feed solutions flow through the $\beta$-conduits to deposit solid on the surface of the $\beta$-conduits. It is see that a feed solution flows over the surface of the deposited solid to give good quality deposit. Vertical columns are provided at the center to connect $\alpha$-layers together. $\gamma$-conduits are provided for the purpose of auxiliary cooling and auxiliary heating.

As has been described, the best way to meet the requirements of providing high pressure vessels for containing the working medium and providing large heat transfer area is to use as small conduits as possible, because the wall thickness required is nearly proportional to the diameter of the conduit. However, in an extruded metal structure, there is a minimum limit to the thickness that can be extruded. For example, the minimum wall thickness for an extruded aluminum structure is about 50 mils. Therefore, it may be economical to provide somewhat larger $\alpha$ conduits and provide extended surface by inserting metal fins in the $\alpha$ conduits. Such metal fins are illustrated in FIG. 6. A piece of metal fin can be manufactured by first forming louvers on a metal sheet and then form it to the desired tubular shape.

FIG. 7 shows a modification of the unified freezer-melter illustrated in FIG. 5. The main modification is to provide wave like surface instead of the straight surface on a $\alpha$-layer. This modification saves the amount of metal used in its manufacture and provide more heat transfer surface at the outside. FIG. 8 shows yet another modification. It is manufactured by connecting small tubes by fins. One way of providing such fins is illustrated in FIG. 18. A sheet of thin metal is wrapped around a set of tubes to provide the fins. It also shows that the metal sheet may be so formed to provide conduit means 39, 40 at the two ends and provid buckles 41 at regular intervals. The tubes are used as high pressure vessels for containing a working medium. Refrigerant used for an auxiliary refrigeration or heating medium used for an auxiliary heating enters into conduit 39 goes through the spaces between the buckles 41 and the tubes and leaves the unit through conduit 40. Several small tube assemblies as shown in FIG. 18 are assembled into a freezer-melter unit as shown in FIG. 17. It consists of an outside vessel 31 and several small tube assemblies 32. A feed solution enters the vessel at the entrance 33 and leavs at outlet 34. An working medium is stored in the small tubes and is pressurized and depressurized through the collecting conduits 35 and the ports 36. We can use smaller diameter conduits in the small tube assemblies as compared to the case of the extruded metal block design.

Another way of forming a small tube assembly is to start with a sheet of aluminum or an aluminum alloy with a layer of braze, form the sheet into a wave pettern, fold the sheet into half and heat treat the sheet to braze the two halves together so that the resulting product contains the desired small conduits. We may also start with a plain metal sheet, follow similar procedures and weld the two halves together to give the desired form.

In order to minimize end effect, we may provide an entrance guide section and a discharge end guidance section. Such a guide section is illustrated by FIG. 9. It shows that a guide section 2 is attached to a metal block freezer-melter unit 1. The $\alpha$-conduit means are used for storing a working medium 3 and the $\beta$-conduits are used for the passage of feed solution 4. Plugs 6 are proveded in each $\alpha$-conduit and an entrance 5 is provided in each $\alpha$-layer for introducing and discharging working medium.

FIG. 10 illustrates a complete freezer-melter assembly provided with an entrance end guide section and a discharge end guide section. The $\alpha$-conduits are provided with plugs 10, and entrance means 9. During step 1, brine enters the unit at ports 14 and leaves at ports 12. Ice is deposited on the surfaces of $\beta$-conduits and working medium is melted in the $\alpha$-conduits. Some working medium is discharged from ports 9. During step 2, ports 12 and 14 are closed and ports 15 and 11 are opened. Fresh water enters at ports 15 pushing floating pistons 13 from the right end to the left end. During step 3, fresh water keeps on entering from ports 15 and is discharged from ports 11 together with the water produced by the melting of ice. Some working medium is pumped into $\alpha$-conduits to keep the medium pressurized. During step 4, ports 11 and 15 are closed and ports 12 and 14 are opened. Brine enters at ports 14 and pushes the floating pistons from the left end to the right end. During step 1 and step 3, the floating pistons are stored at the dead spaces provided at the right end and the left end of the $\beta$-conduits.

FIG. 16 shows a displacement piston provided with a check valve mechanism. The piston 28 is provided with a hollow conduit 30 and a checking plate 29. During step 1 and step 3, the checking plate is detached from the piston so that brine and fresh water respectively can flow through the piston. During step 2 and step 4 the checking plate is attached to the piston and the whole piston is moved across a β-conduit to accomplish the desired displacement operations. When displacement pistons of this design is used the side entrances 11 and 12 shown in FIG. 10 can be eliminated.

TYPE 2 OPERATION

The purified substance itself is used as the working medium for the separation of a solution. For example, in a process of separating fresh water from an aqueous solution, water itself may be used as the working medium. Remembering that both the melting point of water and the freezing point of an aqueous solution are lowered as the applied pressures are increased, the process has to be conducted as follows:

i. In the partial solidification step, the medium side has to be maintained at a high pressure so that the freezing temperature of the solution be higher than the melting point of the medium, water.

ii. In the melting step, the main system side has to be pressurized so that the solidification temperature of the water in the medium side becomes higher than the melting temperature of the ice in the main system side.

In case of separating an organic substance A from a solution containing it, the organic substance A itself may be used as the working medium. Remembering that both the melting point of A and the freezing temperature of the solution are raised as the applied pressures are increased, the process has to be conducted as follows:

i. In the partial solidification step, the main system side has to be maintained at a high pressure so that the freezing temperature of the solution be high than the melting point of the medium A.

ii. In the melting step, the medium side has to be pressurized so that the solidification temperature of the substance A in the medium side is higher than the melting temperature of the deposited A in the main system side.

Since both the main system side and the medium side are alternatively pressurized the confining walls of both the α-conduits and the β-conduits have to be thick enough to withstand the pressure differentials. An extruded honeycomb metal structure can be used for this service.

TYPE 3 OPERATION

A separation process with $(S/L)_W - (S/L)_M$ coupling in which the working medium used is separated from the main system by flexible walls.

In this type of operation, both the main system and the medium system are pressurized and depressurized at the same time; i.e., $(P_W)_s \cong (P_M)_m$ and $(P_W)_m \cong (P_M)_s$. In a $(S/L)_W - (S/L)_M$ coupling process, the total amount of shifting of transition temperatures required is equal to the sum of freezing point depression of the solution and the temperature differentials required in the heat exchangings in the partial solidification and melting steps. This relative shift in transition temperature required is met by the difference in the changes in transition temperatures of the main system and the medium due to the application of pressure.
In other words, we have $$\text{Total shift required} = \left\{ \left(\frac{dT}{dP}\right)_M - \left(\frac{dT}{dP}\right)_W \right\} \Delta P;$$

where $\left(\frac{dT}{dP}\right)_M$ and $\left(\frac{dT}{dP}\right)_W$ are slopes of the melting curves for the medium and the purified deposit of the main system and ΔP is the difference of the pressures at the melting and the partial solidification steps. Since, it is convenient to conduct the solidification step at a near atmospheric pressure, ΔP may be considered as the pressure at the melting step. Type 3 operation can be more favorably applied to cases where the main system and the medium have different signs in $(dT/dP)$ values, because then the operating pressure in the melting step will be less. Therefore, this type of operation can be conveniently applied for separation of fresh water from an aqueous solution. It can also be used for separating an organic solution with water as the working medium.

Refering to FIG. 1, we can use a medium substance which has a normal melting temperature (point 2) somewhat lower than the normal freezing temperature of a feed solution (point 1). By exchanging heat the solution is partially solidified while the medium is melted. On application of pressure to $P_5 = P_6$, the solidification temperature of the medium (point 5) becomes higher than the melting point of ice (point 6) and the medium is solidified as the ice is melted.

This type of operation is still applicable to cases where $$\left(\frac{dT}{dP}\right)_W \text{ and } \left(\frac{dT}{dP}\right)_M \text{ have same sign.}$$

However, the operating pressure in the melting step may become very high. It is also possible to reverse the operation by conducting the partial solidification step at a high pressure and conducting the melting step at a low pressure.

Two methods are available in this type of operation. One is to use deformable vessels as shown in FIG. 13 and the other is to use capsules of medium substance as shown in FIG. 14. The former will be called method B and the latter will be called method C.

METHOD B

FIG. 13 shows a deformable vessel enclosing a medium substance. It is solidified under a high pressure and melted under a low pressure. The vessel contracts as the medium is solidified and expands as the medium is melted. The operation of method B is illustrated by FIG. 11. Several deformable vessels of FIG. 13 are installed in a high pressure vessel. Another way is to wind a long deformable vessel into a spiral form and insert the sprial deformable vessel into a high pressure vessel. It will be noticed that the deformable vessels are so installed in the outer vessel that brine flows parallel to the surfaces of the vessels. Therefore, the brine also flows over the surfaces of the ice deposited on the surfaces of the deformable vessels. This feature is important for the production of high quality ice deposit. The operation proceeds according to the following four steps.

Step 1
Brine flows at a near atmospheric pressure over the surfaces of the deformable vessels. Ice is deposited and the working medium within the deformable vessels is melted.

Step 2
The brine in the vessel is displaced by fresh water.

Step 3
Fresh water is introduced at a pressure (say 2000 psig) high enough that the solidification temperature of the medium becomes higher than the melting point of ice. The ice is melted and the medium is solidified.

Step 4
The fresh water in the vessel is displaced by the feed brine. After this step the operation goes to Step 1 again.

An auxiliary refrigeration should be provided somewhere to keep the system under thermal balance.

Method C

FIG. 14 shows a capsule of a working medium, it consists of an outer shell 21 and working medium within 22. The outer shell may be a thin layer of metal or plastic material. As the medium is solidified under a high pressure, a layer of solid medium 23 is formed within the capsules and the remaining medium liquid 24 is present at the core. As the medium is melted the medium becomes liquid 22. During these solidification and melting operations, the capsule contracts and expands respectively.

Method C operation is described by referring to FIG. 12. Brine feed is heat exchanged in heat exchangers $H_1$ and $H_2$ with reject brine and fresh water to be described and is fed to a freezer unit with solidified capsules and some carrier liquid recycled from a melter M to be described. The freezer is operated at a near atmospheric pressure, $(P_W)_s = P_1 = P_2 = (P_M)_m = 1$ atm.. A layer of ice is deposited on each capsule. The concentrated brine is separated from the mixture in a separator $S_1$ and is heat exchanged with a part of the feed brine in the heat exchanger $H_1$ and is rejected from the system. The capsules with the ice deposited on them and the carrier liquid are mixed again and pumped into a high pressure melter M by a high pressure pump P. The melter is maintained at such a high pressure that ice melts and the medium in the capsules is solidified. The mixture is separated in separator $S_2$ under the high pressure. The fresh water separated is depressurized by a depressurizer $D_1$ and is then heat exchanged with the remaining part of the feed brine and is sent to a storage tank. The mixture of capsules (with solidified medium) and the carrier fluid is cooled by an auxiliary refrigeration before being returned to the freezer unit. Any fluid immiscible with water and the brine may be used as the carrier liquid.

SELECTION OF A WORKING MEDIUM

The working medium to be employed can be either a pure substance or a mixture of substances. It may have a sharp melting point as in the case of a pure or an eutectic mixture, or it may have a melting range. It will be desirable to select a medium whose melting point is close to the freezing temperature of the solution. An ideal working medium should have the following qualities: a proper melting range, a large value for the latent heat of fusion, a low $(dP/dT)_{melting}$ value, cheapness and ready availability.

Examples of potential working medium for separating fresh water from an aqueous solution are: tridecane ( m.p. $= -5.5°$ C.). A mixture of tridecane and tetradecane ( solid solution, melting range varies ), eutectic mixture of benzene and naphthalene ( e. p. $= -3.5°$ C.), n-nonyl alcohol, a mixture of n-alkanols, a mixture of n-alkenes, and several substituted naphphalenes, such as 1,2-Dimethylnaphthalene (m.p. $= -1°$ F.), 1-n-Octylnaphthalene (m.p. $= -2°$ C.), 2-n-Propyl-naphthalene (m.p. $= -3°$ C.), 2-n-Hexylnaphthalene (m.p. $= -3°$ C.), 1,3-Dimethylnaphthalene (m.p. $= -4°$ C.), 2-n-Pentylnaphthalene (m.p. $= -4°$ C.), 2-n-Butylnaphthalene (m.p. $= -5°$ C.).

3. A Separation Process Which is Based on a $(S/L)_W - (L/V)_M$ Coupling.

In a separation process belonging to this category, the working medium undergoes vaporization and solidification respectively as the feed solution is fractionally solidified and the deposited solid is melted. The process takes advantage of the fact that the boiling and condensing temperatures of a working medium are raised by the application of pressure. FIG. 3 shows a freezing temperature curve of an aqueous solution, a melting point curve of water and a vaporization temperature curve for a working medium. By maintaining the solution and the working medium respectively under $(P_W)_s = P_7$ and $(P_M)_v = P_8$, heat flows from the solution to the medium. Therefore, the brine is partially frozen as the medium is vaporized. Then, by maintaining the deposited ice and the medium vapor respectively under $(P_W)_m = P_9$ and $(P_M)_c = P_{10}$, the heat flow is reversed and the ice is melted as the medium vapor is condensed. The medium, therefore, undergoes a cyclic change. The couplings between the two systems are illustrated by the equations shown at the upper end of FIG. 1.

An operation of this process is illustrated by FIG. 4. It consists of four steps. In the operation, two units, unit A and unit B, are used. During Step 1, unit A and unit B are respectively used as a freezer and a melter. The medium is vaporized in the annulus space of unit A at $P_8$, is compressed to $P_{10}$ and is condensed in the annulus space of unit B. In Step 3, the functions of the two units are just reversed. Step 2 and Step 3 are the displacement steps either to displace brine by fresh water or vice versa in preparation for shifting from Step 1 to Step 3 and vice versa respectively.

Two examples of the equipments to be used are illustrated by FIG. 19 and FIG. 20. Refering to FIG. 19, a unified freezer-melter for a $(S/L)_H-(L/V)_m$ coupling consists of a main body 42 and an entrance section 43 and an exit section 44. The main body consists of $\alpha$-conduits and $\beta$-conduits. The condensation and evaporation of the working medium take place in the $\alpha$-conduits and the solidification of the feed solution and melting of the deposited ice take place in the $\beta$-conduits. The working medium enters at port 51 passes through conduit 48 and then enters the $\alpha$-conduits of the main body an passes through conduit 47 and leaves the unit at port 52. During step 1, brine feed enters at port 50 and then enter $\beta$-conduits through ports 45, passes through the $\beta$-conduits and leaves the conduits at ports 46 and finally leaves the unit at port 49. During step 3, fresh water flows through the unit in exactly the reverse route. FIG. 20 shows a circular modification of the unit shown in FIG. 19.

The operation described above in connection with the separation of fresh water from an aqueous solution is also applicable to separation of a substance from a solution containing it.

In any process of the present invention, there is a nucleation problem before the partial solidification step, Step 1, in each cycle is started, because the temperature drop for heat transfer in the solidification step is usually maintained so small that nucleation on the heat transfer surface may not take place spontaneously in some cases. There are several ways to overcome this problem. Some of them are outlined below :

1. Depressurize the working medium after the melting step, Step 3, is over and while the conduit is still filled with water, a purified substance in general, to create a large temperature drop and deposit a very thin layer of solid. This temperature difference is larger than the temperature difference during step 1 by the amount of the freezing point depression of the solution.
2. Nuclei, such as small particles of ice, may be introduced during the step described above.
3. Instal patches or strips of insoluble nucleating agent, such as AgI, on the heat transfer surface to initiate the deposition.
4. Provide local supercooling by electric or other means on the surface at regular intervals.
5. Roughening the surface of the metal wall.

What I claim as my invention and desire to secure by Letters Patent is:

1. A process for effecting a freeze-melt separation of a non-aqueous feed mixture, comprising the steps of establishing a condition having feed mixture in a first zone and having a heat exchange medium which is at least partly in the solid state and has a solid-liquid transition temperature close to the freezing temperature of the feed mixture in a second zone, said first and second zones being maintained in indirect heat exchange relation each with the other, and then subjecting the said two zones and their contents to an operational cycle comprising of the following steps;

a. maintaining the said two zones at a set of respective pressures such that the prevailing solid-liquid transition temperature of the heat exchange medium is less than the currently prevailing freezing temperature of the non-aqueous mixture to simultaneously melt at least a portion of the said heat exchange medium in the second zone and form a separated solid phase and mother liquor in the first zone, and to thereby utilize most of the heat released in the first zone for the heat needed in the second zone, b. separating the mother liquor from the separated solid phase to from a purified solid phase in the first zone, c. maintaining the said two zones at a new set of respective pressures such that the prevailing liquid-solid transition temperature of the said heat exchange medium in the second zone is higher than the currently prevailing solid-liquid transition temperature of the said purified solid phase in the first zone to simultaneously solidify substantial amount of heat exchange medium in the second zone and melt substantial amount of the purified solid phase in the first zone, and to thereby utilize most of the heat released in the second zone for the heat needed in the first zone, and d. removing the melt of the purified solid phase from and introducing a quantity of the feed mixture into the first zone and establish condititions required to perform step (a).

2. A process of claim 1, wherein the non-aqueous solution in the first zone is maintained at near atmospheric pressure during the (a) step and the separated solid phase is also maintained at near atmospheric pressure during the (c) step.

3. A process of claim 1, wherein the thickness of the separated solid phase at the end of step (a) is limited to less than 2 mm.

4. A process of effecting a freeze-melt separation of an aqueous feed mixture, comprising the steps of establishing a condition having feed mixture in a first zone and having a heat exchange medium which is at least partly in the solid state and has a solid-liquid transition temperature close to the freezing temperature of the aqueous feed mixture in a second zone, said first and second zones being maintained in indirect heat exchange relation each with the other, and then subjecting the said two zones and their contents to an operational cycle comprising at least of the following three steps;

a. maintaining the said first zone at a near atmospheric pressure and maintaining the said second zone at an appropriate pressure such that the prevailing solid-liquid transition temperature of the heat exchange medium is less than the currently prevailing freezing temperature of the aqueous mixture to simultaneously melt at least a portion of the said heat exchange medium in the second zone and form a separated ice phase and mother liquor in the first zone, and to thereby utilize most of the heat released in the first zone for the heat needed in the second zone, b. maintaining the said first zone at a near atmospheric pressure and maintaining the said second zone at an appropriate pressure such that the prevailing liquid-solid transition temperature of the heat exchange medium is higher than the currently prevailing solid-liquid transition temperature of the separated ice phase in the first zone to simultaneously solidify substantial amount of the heat exchange medium in the second zone and melt substantial amount of the separate ice in the first zone, and to thereby utilize most of the heat released in the second zone for the heat needed in the first zone, and c. removing the melt of the separated ice from and introducing a quantity of the aqueous feed mixture into the first zone and establish conditions required to perform step (a).

5. A process of claim 4, wherein the thickness of the separated ice phase at the end of step (a) is limited to less than 2 mm.

* * * * *